United States Patent
Jin et al.

(10) Patent No.: US 8,760,783 B2
(45) Date of Patent: Jun. 24, 2014

(54) REAL TIME MRA ESTIMATION AND CORRECTION USING ADC SAMPLES

(71) Applicant: LSI Corporation, Milpitas, CA (US)

(72) Inventors: Ming Jin, Fremont, CA (US); Jun Xiao, Fremont, CA (US); Fan Zhang, Milpitas, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/624,234

(22) Filed: Sep. 21, 2012

(65) Prior Publication Data

US 2014/0085743 A1 Mar. 27, 2014

(51) Int. Cl.
*G11B 20/18* (2006.01)

(52) U.S. Cl.
USPC .......................................................... 360/39

(58) Field of Classification Search
None
See application file for complete search history.

(56) References Cited

U.S. PATENT DOCUMENTS

| | | | |
|---|---|---|---|
| 6,587,292 B1 | 7/2003 | Ashley et al. | |
| 7,511,910 B1 | 3/2009 | Han | |
| 7,894,151 B2 | 2/2011 | Bliss | |
| 2007/0195444 A1* | 8/2007 | Annampedu | 360/39 |
| 2010/0002327 A1* | 1/2010 | Call et al. | 360/31 |

* cited by examiner

*Primary Examiner* — Daniell L Negron
(74) *Attorney, Agent, or Firm* — Suiter Swantz pc llo

(57) ABSTRACT

Methods and systems for estimating MRA for a hard disk drive are described. The methods and systems described herein provide for real time estimating and correcting magneto-resistive head asymmetry (MRA) in a hard disk drive using analog-to-digital convertor (ADC) samples or counts. Generally, ADC outputs may be obtained by injecting MRA at known values, where an estimated MRA may be derived in real time by applying an equation using particular ADC output values. Once an estimated MRA is obtained, MRA correction may be performed when the estimated MRA is larger than a threshold value, such as by adjusting a channel MRA compensation coefficient.

14 Claims, 5 Drawing Sheets

US 8,760,783 B2

REAL TIME MRA ESTIMATION AND CORRECTION USING ADC SAMPLES

FIELD

The present disclosure generally relates to the field of disk drive systems, and more particularly to real time estimating and correcting magneto-resistive head asymmetry (MRA) in a hard disk drive using analog-to-digital convertor (ADC) samples.

BACKGROUND

Magneto-resistive head asymmetry (MRA) in a hard disk drive may cause the read-back signal to become distorted, causing losses in system performance. MRA may be due to improper bias current setting(s) during calibration, due to changes in the physical head characteristics of the read head, or due to other system inaccuracies. MRA may be estimated by is measuring peaks of low frequency patterns, however such techniques are typically relegated to in-factory measurements not suitable for real-time in the field applications. Accordingly, there is a need to provide a method and system to estimate MRA in real time.

SUMMARY

Accordingly, an embodiment of the present disclosure is directed to a method for obtaining a magneto-resistive head asymmetry (MRA) value for a hard disk drive. The method includes obtaining a plurality of analog-to-digital convertor (ADC) counts over a range of ADC sample values utilizing an injected MRA value. The range of ADC sample values includes a negative portion and a positive portion. The method also includes determining a negative peak value. The negative peak value corresponds to an ADC count value at a peak of the negative portion. The method also includes determining a positive peak value. The positive peak value corresponds to an ADC count value at a peak of the positive portion. The method further includes computing, via a computing device, an estimated MRA value based upon the negative peak value and the positive peak value.

A further embodiment of the present disclosure is directed to a computer-readable device having computer-executable instructions for performing a method for obtaining a magneto-resistive head asymmetry (MRA) value for a hard disk drive, where the method includes obtaining a plurality of analog-to-digital convertor (ADC) counts over a range of ADC sample values utilizing an injected MRA value. The range of ADC sample values includes a negative portion and a positive portion. The method also includes determining a negative peak value. The negative peak value corresponds to an ADC count value at a peak of the negative portion. The method also includes determining a positive peak value. The positive peak value corresponds to an ADC count value at a peak of the positive portion. The method further includes determining an estimated MRA value based upon the negative peak value and the positive peak value.

An additional embodiment of the present disclosure is directed to a system, comprising an analog-to-digital convertor (ADC) output measurement device. The ADC output measurement device is configured to measure a plurality of ADC counts over a range of ADC sample values utilizing an injected magneto-resistive head asymmetry (MRA) value. The range of ADC sample values includes a negative portion and a positive portion. The system also includes a computing device in communication with the ADC output measurement device. The computing device includes a memory and a processor in communication with the memory and the ADC output measurement device. The memory stores computer-executable instructions comprising instructions for: determining a negative peak value corresponding to a first ADC count at a peak of the negative portion, determining a positive peak value corresponding to a second ADC count at a peak of the positive portion, and computing an estimated MRA value based upon the negative peak value and the positive peak value.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the presently preferred embodiments of the present disclosure, examples of which are illustrated in the accompanying drawings.

The present disclosure provides implementations for real time estimating and correcting magneto-resistive head asymmetry (MRA) in a hard disk drive using analog-to-digital convertor (ADC) samples or counts. Generally, ADC outputs may be obtained by injecting MRA at known values, where an estimated MRA may be derived in real time by applying an equation using particular ADC output values. Once an estimated MRA is obtained, MRA correction may be performed when the estimated MRA is larger than a threshold value, such as by adjusting a channel MRA compensation coefficient.

Figure 1A:
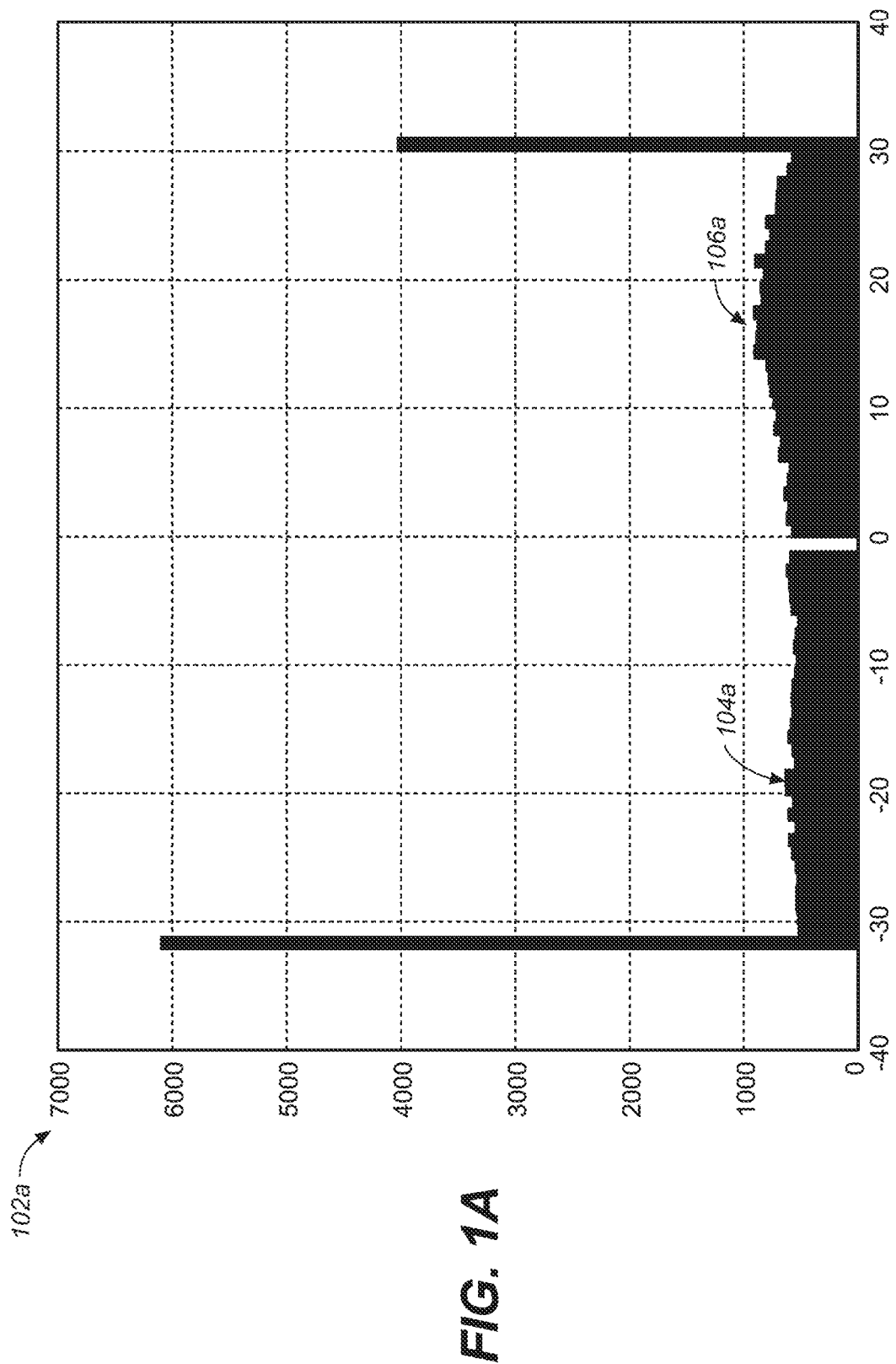
FIG. 1A shows an example histogram of measured ADC output with an injected MRA of −20%.
Figure 1B:
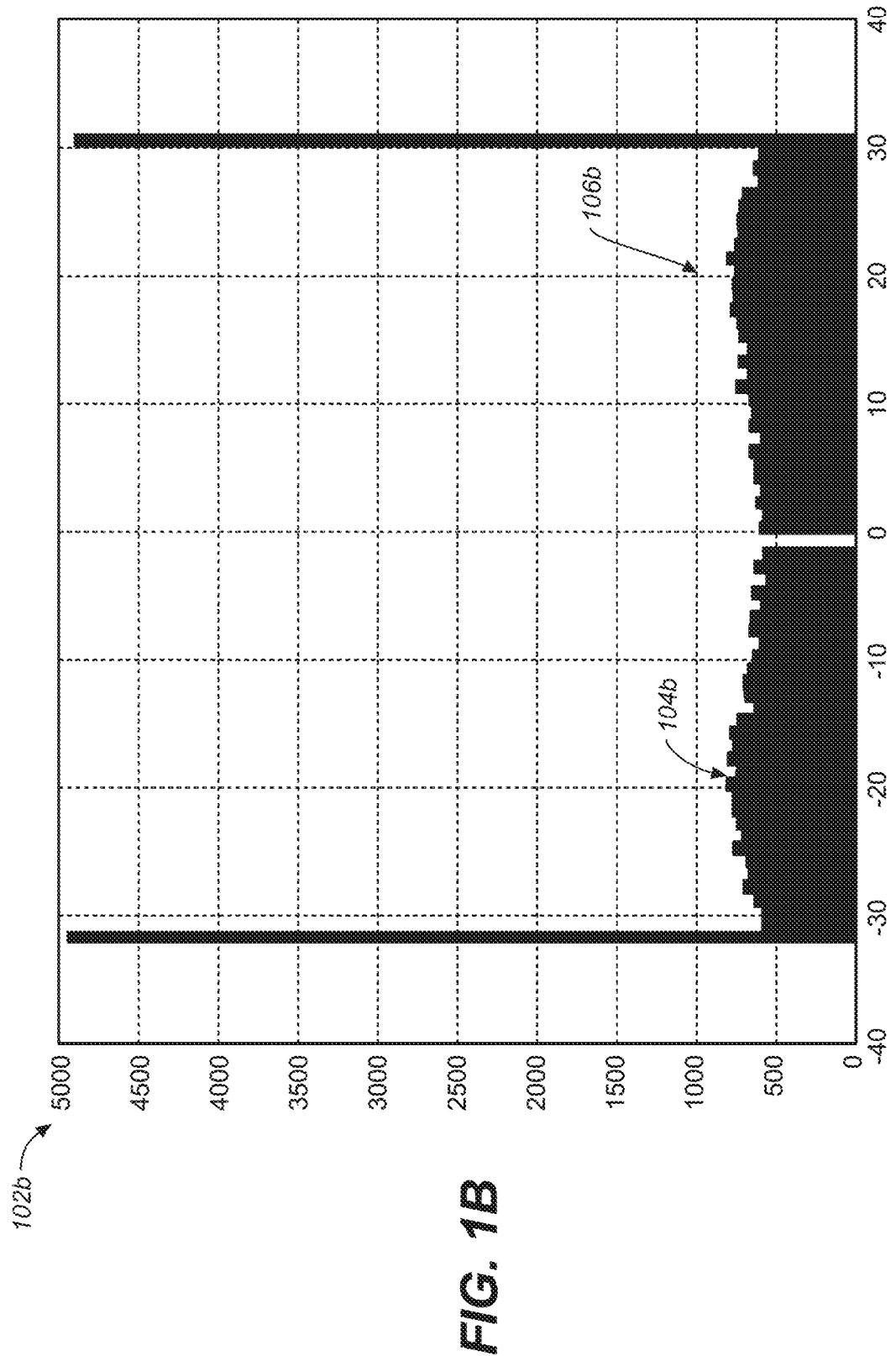
FIG. 1B shows an example histogram of measured ADC output with an injected MRA of 0%.
Figure 1C:
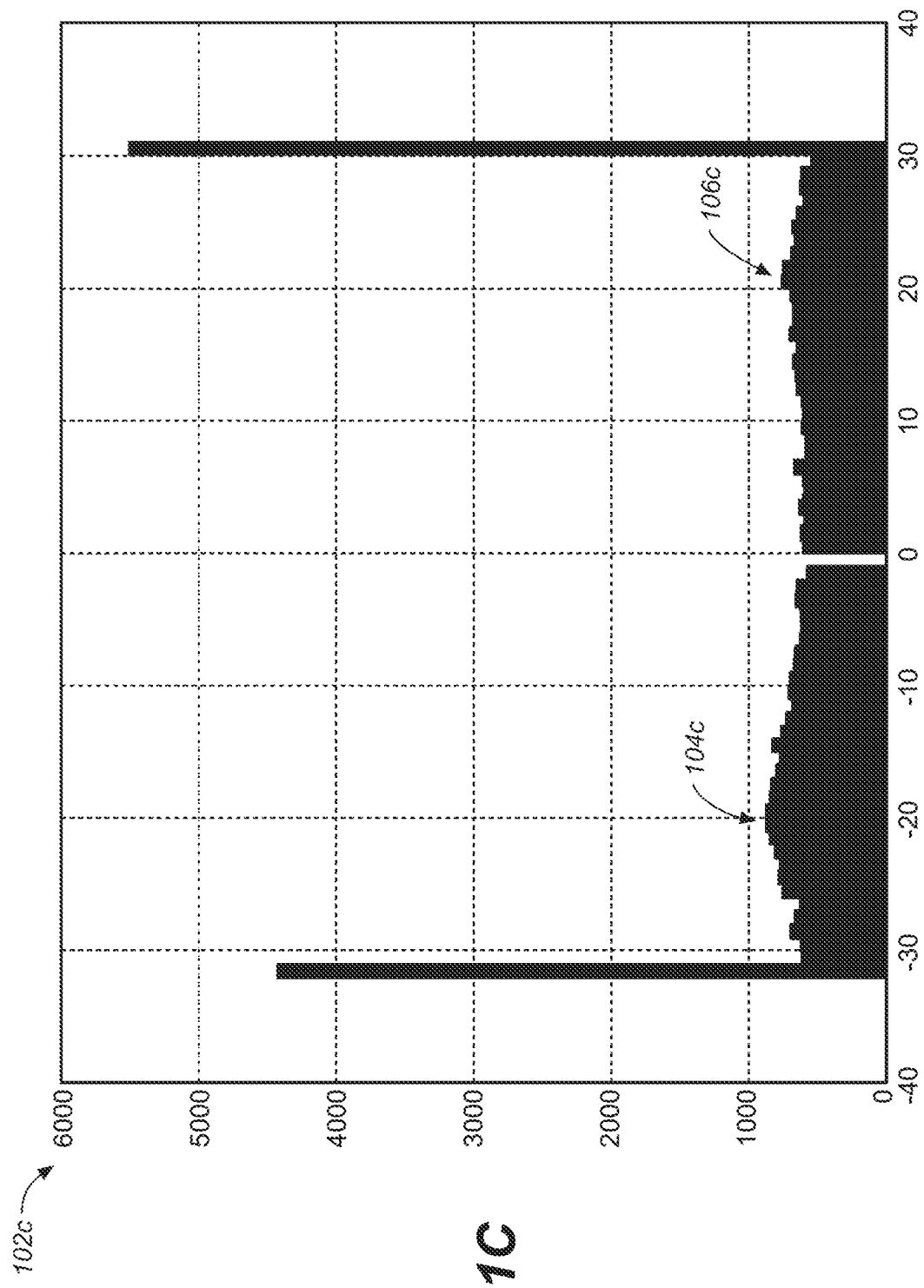
FIG. 1C shows an example histogram of measured ADC output with an injected MRA of +10%.

Referring to FIGS. 1A-1C, example histograms (102a, 102b, 102c) of measured ADC output with known injected MRA values are shown. In particular, FIG. 1A shows an example histogram 102a of measured ADC output with an injected MRA of −20%, FIG. 1B shows an example histogram 102b of measured ADC output with an injected MRA of 0%, and FIG. 1C shows an example histogram 102c of measured ADC output with an injected MRA of +10%. While the example histograms (102a, 102b, 102c) provide measured ADC output over injected MRA of −20%, 0%, and +10%, it is contemplated that other injected MRA values may be utilized. For instance, in a particular implementation, histograms are generated with injected MRA values ranging between −30% and +30% at 5% intervals (i.e., the injected MRA is [−30:5:30]%). In particular implementations, ADC samples range from −32 to 31. The particular range and interval of injected MRA values may depend on a desired granularity of estimated MRA, and/or other factors.

The histograms (102a, 102b, 102c) may provide values to facilitate estimation of an MRA value in real time. In a particular implementation, an estimated MRA value may be obtained according to the following equation:

$$MRA = \frac{(N_{-32} - N_{31})}{(N_{-32} + N_{31})} \times 100\%$$ Equation (1)

where MRA represents the estimated MRA value, $N_{-32}$ represents the counts of ADC samples at the negative peak, and $N_{31}$ represents the counts of ADC samples at the positive peak.

The values of $N_{-32}$ and $N_{31}$ can be seen in FIG. 1A corresponding to the reference characters 104a and 106a, respectively. Similarly, the values of $N_{-32}$ and $N_{31}$ can be seen in FIG. 1B corresponding to the reference characters 104b and 106b, respectively, and can be seen in FIG. 1C corresponding to the reference characters 104c and 106c, respectively. Once known, the values of $N_{-32}$ and $N_{31}$ can be used to estimate an MRA value for each set of $N_{-32}$ and $N_{31}$ according to equation (1).

Figure 2:
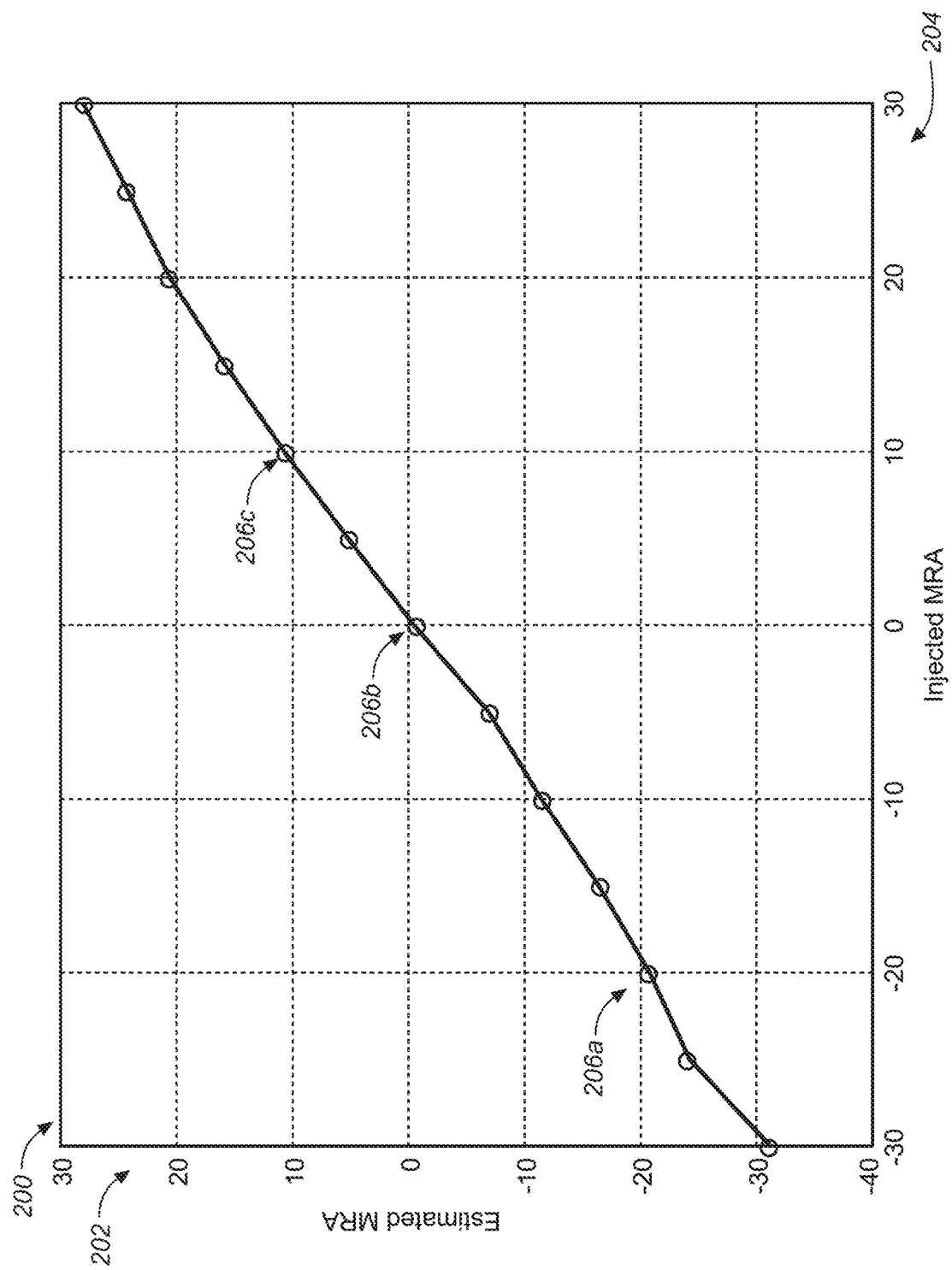
FIG. 2 is an exemplary chart depicting estimated MRA values corresponding to injected MRA values according to a particular implementation of the present disclosure.

FIG. 2 shows an exemplary chart 200 depicting estimated MRA values 202 corresponding to injected MRA values 204 according to a particular implementation of the present disclosure. The estimated MRA values 202 were obtained utilizing equation (1), with the values of $N_{-32}$ and $N_{31}$ being derived from the resultant waveforms of injected MRA values ranging between −30% and +30% at 5% intervals (i.e., the injected MRA is [−30:5:30]%). For instance, reference character 206a corresponds to an estimated MRA value determined via equation (1) with the value of $N_{-32}$ being derived from the counts of ADC samples at the negative peak of FIG. 1A (i.e., reference character 104a), and with the value of $N_{31}$ being derived from the counts of ADC samples at the positive peak of FIG. 1A (i.e., reference character 106a). Similarly, reference character 206b corresponds to an estimated MRA value determined via equation (1) with the value of $N_{-32}$ being derived from the counts of ADC samples at the negative peak of FIG. 1B (i.e., reference character 104b), and with the value of $N_{31}$ being derived from the counts of ADC samples at the positive peak of FIG. 1B (i.e., reference character 106b). Reference character 206c corresponds to an estimated MRA value determined via equation (1) with the value of $N_{-32}$ being derived from the counts of ADC samples at the negative peak of FIG. 1C (i.e., reference character 104c), and with the value of $N_{31}$ being derived from the counts of ADC samples at the positive peak of FIG. 1C (i.e., reference character 106c).

Once an estimated MRA value is obtained, the estimated MRA value may be compared to a threshold value to determine whether the estimated MRA value exceeds the threshold value. When the estimated MRA value is determined to exceed the threshold value, an adjustment may be made to a channel MRA compensation coefficient to provide a more reliable system performance. For instance, the channel MRA compensation coefficient may be adjusted in order to draw the values of $N_{-32}$ and $N_{31}$ closer to each other to provide a more reliable system performance. The threshold value may be determined/selected according to a variety of implementations. For example, the threshold value may be selected based upon a tolerance for a desired system performance level.

Figure 3:
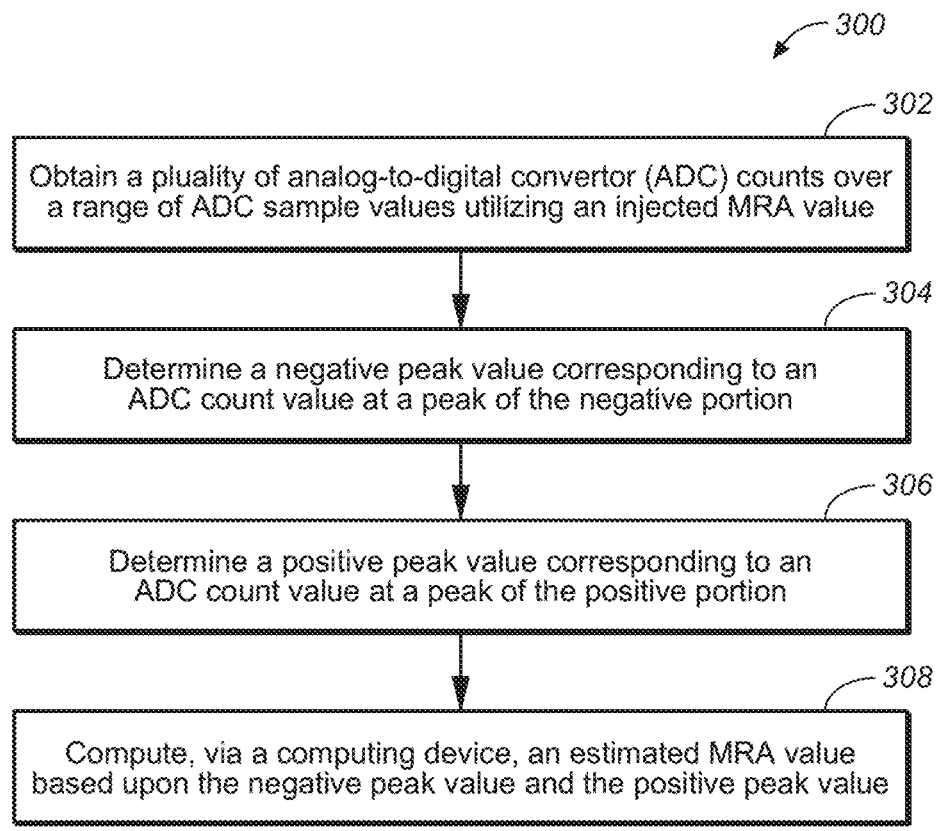
FIG. 3 is a flow chart illustrating a method for obtaining an MRA value for a hard disk drive.

Referring now to FIG. 3, a flow chart illustrating a method 300 for obtaining an MRA value for a hard disk drive is displayed. Step 302 may obtain a plurality of analog-to-digital convertor (ADC) counts over a range of ADC sample values utilizing an injected MRA value. The range of ADC sample values includes a negative portion and a positive portion. Step 304 may determine a negative peak value. The negative peak value corresponds to an ADC count value at a peak of the negative portion. Step 306 may determine a positive peak value. The positive peak value corresponds to an ADC count value at a peak of the positive portion. Step 308 may compute, via a computing device, an estimated MRA value based upon the negative peak value and the positive peak value. In a particular embodiment, the estimated MRA is computed according to equation (1) by the computing device.

Figure 4:
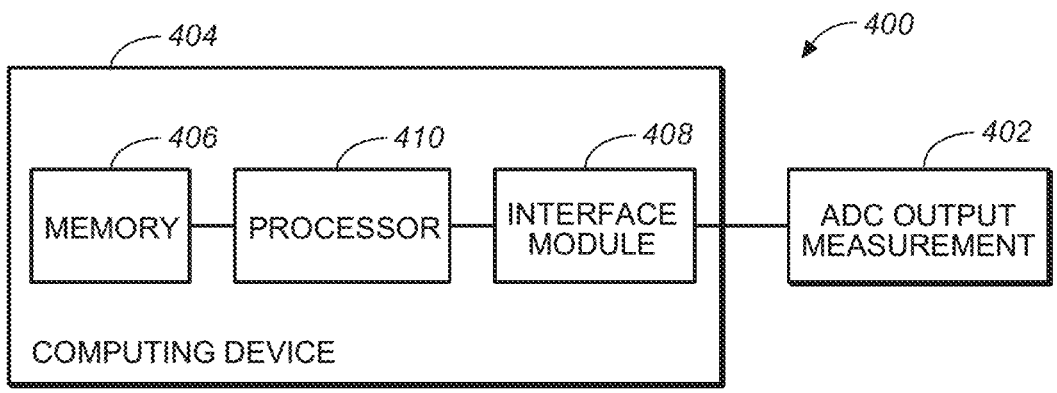
FIG. 4 is a block diagram illustrating a system for estimated MRA values in real time.

Referring now to FIG. 4, a block diagram illustrating a system 400 for estimated MRA values in real time is shown. In general, system 400 includes an ADC output measurement device 402 and a computing device 404 including a memory 406, an interface module 408, and a processor 410. The ADC output measurement device 402 may be configured to measure a plurality of ADC counts over a range of ADC sample values utilizing an injected MRA value. The range of ADC sample values may include a negative portion and a positive portion. For example, the ADC output measurement device 402 may determine the counts of ADC samples shown in FIGS. 1A-1C, where the range of ADC sample values ranges from −32 to 31 (i.e., through a negative portion to a positive portion). The computing device 404 may be in communication with the ADC output measurement device 402. For instance, the interface module 408 of the computing device 404 may be configured for receiving an ADC output measurement from the ADC output measurement device 404. The processor 410 of the computing device 404 may be configured for information and data handling processes, including data manipulation, calculations, and the like. The processor 410 may be in communication with the memory 406 and the interface module 408. The memory 406 may store computer-executable instructions for performing a method for obtaining an MRA value for a hard disk drive, the method comprising: determining a negative peak value corresponding to a first ADC count at a peak of the negative portion, determining a positive peak value corresponding to a second ADC count at a peak of the positive portion, and computing an estimated MRA value based upon the negative peak value and the positive peak value. In a particular embodiment, the estimated MRA is computed according to equation (1) by the computing device.

It is contemplated that while the examples described with reference to FIG. 4 show an ADC output measurement device as a stand-alone device in communication with the computing device, the methods and systems for real-time estimation of MRA values are not limited to such stand-alone devices. ADC output measurement devices embedded with the computing device may be utilized, such that an embedded ADC output measurement device is in communication with the computing device and its components. It is also contemplated that with an embedded ADC output measurement device, the processor may directly or directly (e.g., via memory 406) be in communication with the embedded ADC output measurement device, such that no interface module between the ADC output measurement device and the computing device is utilized.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A method for obtaining a magneto-resistive head asymmetry (MRA) value for a hard disk drive, comprising:
   obtaining a plurality of analog-to-digital convertor (ADC) counts over a range of ADC sample values utilizing an injected MRA value, the range of ADC sample values including a negative portion and a positive portion;
   determining a negative peak value, the negative peak value corresponding to an ADC count value at a peak of the negative portion;
   determining a positive peak value, the positive peak value corresponding to an ADC count value at a peak of the positive portion; and
   computing, via a computing device, an estimated MRA value based upon the negative peak value and the positive peak value:
   according to equation (1):

$$MRA = \frac{(N_{-32} - N_{31})}{(N_{-32} + N_{31})} \times 100\% \quad (1)$$

wherein MRA is the estimated MRA value, $N_{-32}$ is the negative peak value and $N_{31}$ is the positive peak value.

2. The method of claim 1, further comprising:
   determining whether the estimated MRA value exceeds a threshold value.

3. The method of claim 2, further comprising:
   adjusting a channel MRA compensation coefficient of the hard disk drive when the estimated MRA value is determined to exceed the threshold value.

4. The method of claim 3, wherein the negative peak value and the positive peak value are closer in value upon adjusting the channel MRA compensation coefficient than prior to adjusting the channel MRA compensation coefficient.

5. The method of claim 1, wherein the injected MRA value is between about −30% and 30%.

6. A computer-readable device having computer-executable instructions for performing a method for obtaining a magneto-resistive head asymmetry (MRA) value for a hard disk drive, the method comprising:
   obtaining a plurality of analog-to-digital convertor (ADC) counts over a range of ADC sample values utilizing an injected MRA value, the range of ADC sample values including a negative portion and a positive portion;
   determining a negative peak value, the negative peak value corresponding to an ADC count value at a peak of the negative portion;
   determining a positive peak value, the positive peak value corresponding to an ADC count value at a peak of the positive portion;
   determining an estimated MRA value based upon the negative peak value and the positive peak value;
   determining whether the estimated MRA value exceeds a threshold value; and
   adjusting a channel MRA compensation coefficient of the hard disk drive when the estimated MRA value is determined to exceed the threshold value.

7. The computer-readable device of claim 6, wherein determining an estimated MRA value based upon the negative peak value and the positive peak value comprises:
   determining the estimated MRA value according to equation (2):

$$MRA = \frac{(N_{-32} - N_{31})}{(N_{-32} + N_{31})} \times 100\% \quad (2)$$

wherein MRA is the estimated MRA value, $N_{-32}$ is the negative peak value and $N_{31}$ is the positive peak value.

8. The computer-readable device of claim 6, wherein the negative peak value and the positive peak value are closer in value upon adjusting the channel MRA compensation coefficient than prior to adjusting the channel MRA compensation coefficient.

9. The computer-readable device of claim 6, wherein the injected MRA value is between about −30% and 30%.

10. A system, comprising:
    an analog-to-digital convertor (ADC) output measurement device, the ADC output measurement device configured to measure a plurality of ADC counts over a range of ADC sample values utilizing an injected magneto-resistive head asymmetry (MRA) value, the range of ADC sample values including a negative portion and a positive portion; and
    a computing device in communication with the ADC output measurement device, the computing device including:
    a memory; and
    a processor in communication with the memory and the ADC output measurement device,
    wherein the memory stores computer-executable instructions comprising instructions for:
       determining a negative peak value corresponding to a first ADC count at a peak of the negative portion;
       determining a positive peak value corresponding to a second ADC count at a peak of the positive portion;
       computing an estimated MRA value based upon the negative peak value and the positive peak value;
       determining whether the estimated MRA value exceeds a threshold value; and
       adjusting a channel MRA compensation coefficient of the hard disk drive when the estimated MRA value is determined to exceed the threshold value.

11. The system of claim 10, wherein the instructions for computing an estimated MRA value based upon the negative peak value and the positive peak value comprise:

instructions for computing the estimated MRA value according to equation (3):

$$MRA = \frac{(N_{-32} - N_{31})}{(N_{-32} + N_{31})} \times 100\% \qquad (3)$$

wherein MRA is the estimated MRA value, $N_{-32}$ is the negative peak value and $N_{31}$ is the positive peak value.

12. The system of claim 10, wherein the negative peak value and the positive peak value are closer in value upon adjusting the channel MRA compensation coefficient than prior to adjusting the channel MRA compensation coefficient.

13. The system of claim 10, wherein the computing device further comprises:
an interface module in communication with the processor and the memory, the interface module configured to receive an ADC output measurement from the ADC output measurement device.

14. The system of claim 10, wherein the injected MRA value is between about −30% and 30%.

* * * * *